United States Patent [19]

Jones

[11] Patent Number: 4,537,090

[45] Date of Patent: Aug. 27, 1985

[54] VERNIER CONTROL DEVICE

[75] Inventor: Michael E. Jones, Wooster, Ohio

[73] Assignee: Eaton Corporation, Cleveland, Ohio

[21] Appl. No.: 562,772

[22] Filed: Dec. 19, 1983

[51] Int. Cl.³ ............................................... F16C 1/10
[52] U.S. Cl. ..................................................... 74/502
[58] Field of Search ........................ 74/424.1, 501, 502

[56] References Cited

U.S. PATENT DOCUMENTS 4,050,327  9/1977  Thomas ................................. 74/502
4,199,999  4/1980  Metz ..................................... 74/424.8

FOREIGN PATENT DOCUMENTS 593616  3/1960  Canada ................................. 74/502
410797  12/1909  France ................................. 74/502
469091  2/1952  Italy ..................................... 74/502

*Primary Examiner*—William L. Freeh
*Attorney, Agent, or Firm*—C. H. Grace; A. E. Chrow

[57] ABSTRACT

Disclosed is an embodiment (60) of an improved vernier control device for selectively moving an object in gross or incremental, vernier amounts of the type comprising a housing (2) fixed against movement with respect to the object to be moved having an open-ended bore (4) extending therethrough having threads (6) disposed on wall (7) of the housing surrounding bore (6). Bore (6) contains a sleeve (8) that is moveable both axially and rotatably within the housing bore and has one end rotatably connected to the object and a bore (10) therewithin extending from the opposite end. An operating rod (30) is disposed within and is at least axially moveable within the sleeve bore. Device 60 is provided with lower friction and improved resistance to thread wear and the ability to withstand increased axial force on the threads as a result of the sleeve having a pair of apertures (35) through opposite walls through which respective thread engagement members (34) are able to be moved radially outwardly into threaded engagement with the threads in response to movement of an intermediate member (36) by movement of the rod axially to a thread engagement position within the sleeve bore so that rotation of the sleeve causes the object to move in vernier amounts and movement of the rod towards the end of the sleeve connected to the object enables members (34) to move radially inwardly through the respective apertures an amount sufficient to cause disengagement with the threads and enables the sleeve to be moved axially within the housing bore and move the object in gross amounts.

9 Claims, 3 Drawing Figures

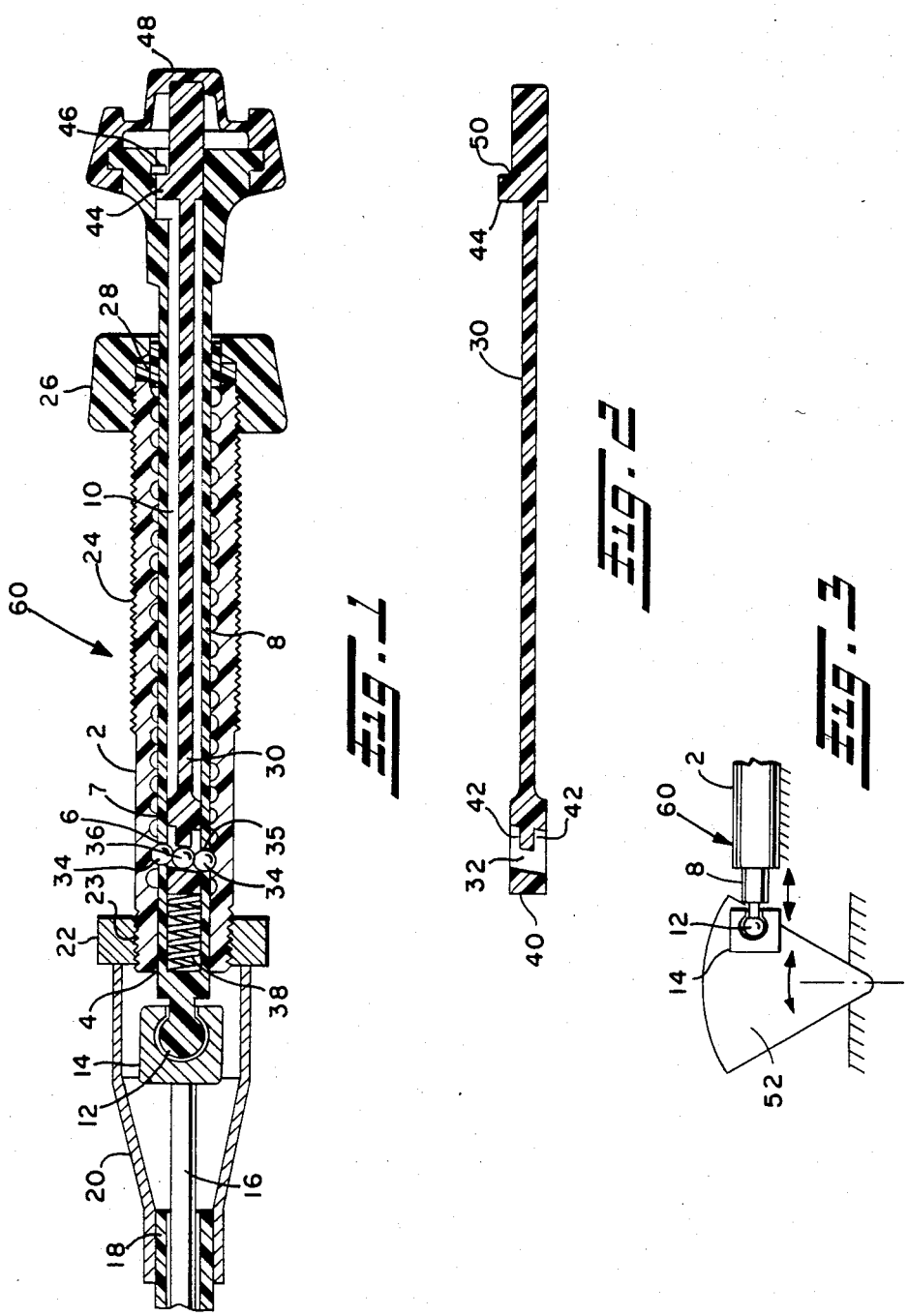

VERNIER CONTROL DEVICE

INTRODUCTION

This invention relates to an improved vernier control device for selectively moving an object in gross or vernier, incremental amounts and more particularly to the use of such device in controlling the movement of a push-pull cable.

BACKGROUND OF THE INVENTION

Vernier control devices for use in controlling the direction and amount of movement of a push-pull control cable have been used for many years. Examples of various types of such vernier control devices are disclosed in U.S. Pat. Nos. 3,395,592; 3,405,567; 3,521,502; and 3,643,523, the disclosures of which are included herein by reference.

The control devices described in all of the above described patents, except U.S. Pat. No. 3,521,502, are generally of the type featuring a tubular open-ended sleeve slidably received within an open-ended bore of a housing which itself is characteristically tubular in shape with some type of thread means secured to a wall of the housing bore intermediate the wall and the sleeve. The sleeve is typically able to both rotate and move axially within the housing bore with one end of the sleeve operatively connected to the core of a push-pull cable slidably contained within a casing that is secured to the housing. An operating rod is disposed within a bore of the sleeve and is generally able to move either or both axially and rotationally with respect thereto. The sleeve is generally provided with a single aperture through its wall such that movement of the rod axially or rotationally within the sleeve bore causes a single ball bearing to move radially outwardly through the aperture to the extent necessary to enable a portion of the ball to engage with the threads so that rotation of the sleeve in opposite directions causes the sleeve to move along the housing bore and move the cable core corresponding in opposite axial directions within the cable casing in vernier or incremental amounts and rotational or axial movement of the operating rod into a position other than the thread engagement position causes the ball to move radially inwardly through the aperture an amount sufficient to cause the ball to disengage from the threads and enable the sleeve to be moved axially in opposite directions within the housing bore and move the cable core axially in corresponding opposite directions in gross amounts within the cable casing. Generally included, is some type means such as as a spring for biasing the operating rod into the thread engagement position within the sleeve bore.

Rather than using a ball, the device of U.S. Pat. No. 3,521,502 features a sleeve having a threaded outer wall that can be pivoted into threaded engagement with a small gear tooth rack on one side of the housing bore wall.

The prior art vernier control devices whether by use of a single ball or by a single gear tooth rack have the disadvantage of establishing threaded engagement with the housing bore on only one side of the sleeve which, when the sleeve is threadingly engaged with the threads or gear tooth rack in the housing bore, necesarily concentrates any axial force exerted on the sleeve over a small circumferential area of the threads which may lead to premature wear and stripping of the threads.

SUMMARY OF THE INVENTION

Accordingly, it is an object of this invention to provide an improved vernier control device for selectively moving an object in gross or vernier, incremental amounts.

It is another object of this invention to provide an improved vernier control device for selectively moving an object such as a push-pull cable in gross or vernier, incremental amounts by means of a threaded engagement that distributes axial load within the control over a broader circumferential area than has heretofore been the practice in the past.

It is a further object of this invention to provide an improved vernier control device for selectively controlling movement of an object in gross or vernier, incremental amounts, that is provided with extended working life, lower friction and the ability to withstand greater loads by reason of distributing the load over a broader area than has hereto been the practice in the past.

BRIEF DESCRIPTION OF THE DRAWINGS

FIG. 1 is a central longitudinal cross-sectional side view of an embodiment of the vernier control device of the invention rotatably secured to a push-pull cable shown in a partial cross-sectional view;

FIG. 2 shows a central longitudinal cross-section through an operating rod used in the device of FIG. 1; and FIG. 3 shows a partial schematic side elevation view of the device of FIG. 1 moving an object rotationally.

DESCRIPTION OF A PREFERRED EMBODIMENTS

A preferred embodiment of the vernier control device of the invention in shown in the form of device 60 in FIG. 1. Device 60 has a housing 2 having an open-ended bore 4 therethrough. Threads 6 having a prescribed pitch "P" (not referenced) are disposed on wall 7 surrounding bore 4. Control sleeve 8 is disposed within bore 4 in the manner shown in FIG. 1. Sleeve 8 is moveable both axially and rotationally with respect to bore 4.

One end of sleeve 8 is rotatably secured to core 16 of a push-pull cable by means of the ball 12 and socket 14 arrangement shown in FIG. 1 so that rotation of sleeve 8 does not impart a twist to core 16. Core 16 is slidably received within a casing 18 of the push-pull cable that is in turn secured to housing 2 by means of connector 20 that is secured to casing 18 at one end and preferably rotatably secured to housing 2 at the opposite end by means of a nut 22 that is threadingly engaged with threads 23 on housing 2.

Although particularly useful for selectively controlling axial movement of a push-pull cable, particularly the core of a push-pull cable that is slidably received within a casing, the control device of the invention may be used to control movement of any object including rotational movement as hereinafter described with respect to FIG. 3.

Sleeve 8 of device 60 may be rotatably secured to the object being moved by device 60 in any suitable manner. Generally, housing 2 is restricted against movement with respect to the object being moved by device 60 in any suitable manner. A pair of spaced-apart nuts (not shown) may, for example, be threadingly engaged with threads 24 which are then advanced towards each other to secure housing 2 to a panel or the like interposed between the nuts.

Although shown in the form of threads in wall 7 of housing 2, other means may be used to provide a thread means intermediate wall 7 and sleeve 8 such as a coiled spring secured to wall 7 intermediate wall 7 and sleeve 8.

Sleeve 8 has a bore 10 therewithin that extends from the end of sleeve 8 opposite from the end of sleeve 8 secured to core 16.

An operating rod 30 is disposed in bore 10 of sleeve 6 in the manner shown in FIG. 1. Rod 30 is moveable at least axially with respect to bore 10. As shown in FIG. 3, rod 30 has an end 40 closest to the end of sleeve 8 connected to rod 16 and has a transverse bore 32 therethrough adjacent end 40 communicating with spaced-apart relieved portions 42 on opposite sides of rod 30 facing in opposite directions towards wall 7.

A biasing means in the form of spring 38 is disposed in bore 10 intermediate the end of sleeve 8 secured to core 16 and end 40 of rod 30. Understandably, the biasing means disposed in bore 10 may be any suitable resilient member such as a suitable rubber or the like.

Disposed within bore 32 of rod 30 is third member 36 shown in FIG. 1 in an intermediate position between first and second thread engaging members 34. Members 34 are dimensionally adapted to move radially outwardly and inwardly through a pair of apertures 35 through opposite sides of the wall of sleeve 8 in response to axial movement of rod 30 as hereinafter more fully described. Members 34 are adapted to engage threads 6 when respectively moved radially outwardly through apertures 34 in response to axial movement of rod 30. Although preferably having a ball-like configuration such as a ball bearing, members 34 and member 36 may have any configuration that enables members 34 to engage and disengage with threads on the wall of bore 4 of housing 2 in response to axial movement of rod 30.

Although other spaced arrangements may be used, apertures 35 are preferably spaced-apart axially from each other by a distance of ½ the pitch "P" of threads 6 so that members 34 are able to engage a single thread within ½ the pitch distance of the thread.

Biasing means 38 presses against end 40 of rod 30 and urges rod 30 axially to move member 36 at least into an intermediate position between members 36, a position which in turn causes members 34 to move radially outwardly into the thread engaged condition shown in FIG. 1. Rod 30 is prevented from moving in a direction away from the end of sleeve 8 that is secured to core 16 by means of a stop 46 secured to the wall of sleeve 8. Stop 46 may be in the form of an insertable snap-ring or the like secured to sleeve 8 that presses against a face 50 of a shoulder 44 of rod 30 as shown in FIGS. 1 and 2 and is positioned to insure that rod 30 in conjunction with the biasing means 38 and stop 46 holds member 36 in the intermediate position between members 34 when rod 30 is in the thread engagement position shown in FIG. 1. A resilient member such as end-cap 48 may be secured to sleeve 8 for protecting rod 30 from external contamination when such is desired. In device 60, cap 48 is made from a suitably resilient material that presses against the end of rod 30 opposite to end 40 and urges rod 30 axially along bore 10 in a direction towards the end of sleeve 8 secured to core 16.

In device 60, end 40 and bore 32 of rod 30 are preferably tapered to approximate ½ of the pitch "P" of threads 6 so as to enhance the positioning of member 36 between members 34.

As shown in FIGS. 1 and 2, rod 30 is provided with means for enabling members 34 to move radially inwardly a distance sufficient to cause disengagement between threads 6 and members 34 when rod 30 is moved against biasing means 38 towards the end of sleeve 8 secured to core 16 from the thread engagement position shown in FIG. 1. The means is provided by rod 30 having previously described opposed relieved portions 42 communicating with the side of bore 32 facing towards the end of rod 30 opposite to end 40. Relieved portions 42 face towards wall 7 and are dimensionally adapted to enable the required radial inward movement of members 34 to effect disengagement with threads 6 when rod 30 is moved in a direction towards the end of sleeve 8 from the thread engagement position shown in FIG. 1.

In operating, device 60 in the thread engagement condition shown in FIG. 1 is able to move core 16 axially within casing 16 in incremental amounts by rotating sleeve 8 which because of the threaded engagement between members 34 and threads 6 is caused to move axially along bore 4 of housing 2 in incremental amounts determined by the pitch "P" of threads 6. The resultant axial incremental movement of sleeve 6 causes incremental axial movement of core 16 within casing 18 without twisting core 16 due to the rotatable secured relationship therebetween. The device of the invention enables thread engagement to occur on opposite sides of sleeve 8 which greatly increases the force required to disengage sleeve 8 without pressing rod 30 forward in the manner described herein and also increases the circumferential area of stress exerted on threads 6 resulting in reduced wear and possible stripping of the threads.

Moving rod 30 along bore 10 in a direction against biasing means 38 and towards the end of sleeve 8 secured to core 16 causes rod 30 to move member 36 in the same direction from its intermediate position between members 34 while compressing the biasing means against the end of bore 10 and enables members 34 to move radially inwardly through their respective apertures 35 into the space between wall 7 and rod 30 provided by relieved portions 42 and disengage from threads 6. In the disengaged position, sleeve 8 is able to be moved axially in gross amounts along bore 4 of housing 2 which in turn causes core 16 to be moved axially within casing 18 in gross amounts due to the securement between sleeve 8 and core 16.

One of the advantages associated with members 34 and member 36 having a ball-like configuration such as a ball bearing is that such configuration enables them to roll against each other which results in attractively low friction particularly when rod 30 is positioned in the thread engagement position.

Device 60 is preferably provided with a means for securing sleeve 8 against axial and rotational movement with respect to bore 4 of housing 2. In device 60, the means is provided by compressing a compressible member 28 between sleeve 8 and wall 7 surrounding bore 4 by nut 26 that is threadingly engaged to threads 24 on the exterior of housing 2 as shown in FIG. 1.

FIG. 3 shows device 60 being used to rotate an object 52 about an axis rather than moving a push-pull cable. In FIG. 3, housing 2 of device 60 is secured against movement with respect to object 52. Sleeve 8 is rotatably secured to object 52 by means of ball 12 of sleeve 8 being rotatably held by socket 14 secured to object 52.

It can readily be seen that axial movement of sleeve 8 in gross or vernier, incremental amounts in the manner hereinbefore described is able to rotate object 52 in correspondingly gross or incremental amounts. Object 52 may, for example, be operatively connected to a vehicular carburetor throttle or choke plate.

The device of the invention may be made from any suitable metallic or polymeric material or combinations of such material suitable for a particular application. Of particular advantage is where housing of the control device of the invention is molded from a polymeric material such as acetyl copolymer in a process in which the thread means are formed in the wall of the open-end bore through the housing for receiving the sleeve.

What is claimed is:

1. An improved vernier control device for selectively moving an object in gross or vernier, incremental amounts, said device comprising a housing secured against movement with respect to the object and having an open-ended bore therethrough surrounded by a wall of the housing, a control sleeve slidably received within the housing bore and moveable in opposite axial and rotational directions with respect thereto, said sleeve having one end rotatably secured to the object and having a bore therewithin extending from the opposite end thereof, an aperture extending through the wall of the sleeve between the housing bore and the sleeve bore, an operating rod disposed in the sleeve bore and moveable axially in opposite directions with respect thereto, thread means having a prescribed pitch disposed on the housing bore wall intermediate said wall and the sleeve, and thread engagement means moveable radially through the control sleeve aperture into and out of engagement with the thread means according to the position of the operating rod along the sleeve bore, wherein the improvement is characterized by said device provided with lower friction and having improved resistance to wear of the thread means and having the ability to withstand increased axial force between the thread engagement means and the thread means as a result of said thread engagement means comprising:

a pair of apertures extending through opposite sides of the sleeve wall between the housing bore and the sleeve bore, first and second thread engaging members respectively moveably disposed within each aperture, said members having a ball-like configuration dimensionally adapted to move radially inwardly and outwardly therethrough, a third member disposed within a bore through the operating rod adjacent the end thereof closest to the end of the sleeve secured to the object and moveable axially along the sleeve bore in response to axial movement of the operating rod therewithin, said member having a ball-like configuration dimensionally adapted such that axial movement thereof to an intermediate position between the first and second members in response to movement of the operating rod to a thread engagement position within the sleeve bore urges each of said members radially outwardly through the respective apertures a distance sufficient to establish threaded engagement with the thread means, biasing means disposed in the sleeve bore intermediate the operating rod and the end of the sleeve to which the object is secured, said biasing means adapted to urge the operating rod axially along the sleeve bore in a direction away from said end to at least the position at which the third member is positioned intermediate the first and second members, stop means secured to the sleeve holding the operating rod against the biasing means when the third member is in the intermediate position between the first and second members so that the sleeve is caused to move axially along the housing bore and move the object in incremental amounts determined by the thread means pitch in response to rotation of the sleeve, and means enabling the first and second members to move radially inwardly a distance sufficient to cause the disengagement thereof with the thread means response to axial movement of the operating rod in a direction towards the end of the sleeve secured to the object enabling movement of the object in gross amounts in response to axial movement of the sleeve in gross amounts within the sleeve bore.

2. The device of claim 1 wherein the means enabling the first and second members to move radially inwardly in response to movement of the rod towards the end of the sleeve secured to the object comprises relieved portions on opposite sides of the operating rod communicating with the side of the operating rod bore facing away from the end of the sleeve secured to the object, said relieved portions dimensionally adapted to enable the first and second members to move radially inwardly a distance sufficient to cause the disengagement thereof with the thread means in response to movement of the operating rod from the thread engagement position in a direction towards the end of the sleeve secured to the object.

3. The device of claim 1 including a resilient member that is secured to the sleeve and urges the operating rod in a direction towards the end of the sleeve secured to the object.

4. The device of claim 3 wherein the resilient member is in the form of an end cap that presses against the end of the rod opposite to the end thereof closest to the end of the sleeve secured to the object.

5. The device of claim 1 including means for securing the sleeve from axial and rotational movement with respect to the housing.

6. The device of claim 5 wherein the means comprises a compressible member that is able to be compressed between the sleeve and the housing bore by a nut that is threadingly engaged with threads on the housing.

7. The device of claim 1 wherein the object is a push-pull cable.

8. The device of claim 7 wherein the cable is slidably received within a casing that is secured against movement with respect to the cable.

9. The device of claim 7 wherein the casing is secured to the housing.

* * * * *